(12) United States Patent
D'Alessandro et al.

(10) Patent No.: US 8,363,553 B2
(45) Date of Patent: Jan. 29, 2013

(54) OPTIMIZED DYNAMIC ROUTING IN AN OPTICAL NETWORK

(75) Inventors: Alessandro D'Alessandro, Turin (IT); Roberto Morro, Turin (IT); Victoria Salmeron Santos, Turin (IT)

(73) Assignee: Telecom Italia S.p.A., Milan (IT)

( * ) Notice: Subject to any disclaimer, the term of this patent is extended or adjusted under 35 U.S.C. 154(b) by 818 days.

(21) Appl. No.: 12/085,694

(22) PCT Filed: Nov. 29, 2005

(86) PCT No.: PCT/EP2005/012717
§ 371 (c)(1), (2), (4) Date: Sep. 3, 2009

(87) PCT Pub. No.: WO2007/062670
PCT Pub. Date: Jun. 7, 2007

(65) Prior Publication Data
US 2010/0014859 A1     Jan. 21, 2010

(51) Int. Cl.
*H04L 12/28* (2006.01)

(52) U.S. Cl. ........................ 370/238; 370/389

(58) Field of Classification Search .............. 370/238, 370/254, 389; 701/122
See application file for complete search history.

(56) References Cited

U.S. PATENT DOCUMENTS

| | | | |
|---|---|---|---|
| 5,856,927 A * | 1/1999 | Greidinger et al. | 716/122 |
| 6,538,777 B1 | 3/2003 | Barry et al. | |
| 2003/0016414 A1 | 1/2003 | Solheim et al. | |
| 2006/0178819 A1* | 8/2006 | Couckuyt et al. | 701/209 |
| 2007/0058568 A1* | 3/2007 | Previdi et al. | 370/254 |
| 2007/0297405 A1* | 12/2007 | He | 370/389 |

FOREIGN PATENT DOCUMENTS

EP      1 278 324 A2    1/2003

OTHER PUBLICATIONS

B. Li, et al., Routing and wavelength assignment vs. wavelength converter placement in all-optical networks, IEEE Optical Communications, pp. S22-S28, (2003).
I. Tomkos, et al., Performance engineering of metropolitan area optical networks through impairment constraint routing, IEEE Optical Communications, pp. S40-S47, (2004).
A. Jukan, et al., "Resource allocation strategies with QoS-routing in optical networks", ICC '99, 1999 IEEE International Conference of Communications. Conference Record. Vancouver, CA, IEEE International conference on communications, New York IEEE, U.S., vol. 3, pp. 2048-2054,(1999).
K. Taira, et al., "Efficient Lightpath Routing in Wavelength-Routed Optical Networks", ICOIN 2002, LNCS 2343, pp. 291-304, (2002).

* cited by examiner

*Primary Examiner* — Ricky Ngo
*Assistant Examiner* — Phuongchau B Nguyen
(74) *Attorney, Agent, or Firm* — Finnegan, Henderson, Farabow, Garrett & Dunner, L.L.P.

(57) ABSTRACT

A routing method for a network including a first type of nodes and a second type of nodes, in particular an optical telecommunication network including transparent codes and regenerating nodes, includes: constructing a simplified network topology including the given node, the second nodes, first paths between the given node and the second nodes and second paths between each couple of second nodes, wherein the first and second paths pass only through first nodes and have an acceptable run-through cost, and, if the given node receives a routing request specifying a destination node that is reachable only through a second node, constructing an enhanced network topology by adding to the simplified network topology the destination node and third paths between the destination node and the second nodes that pass only through first nodes and have an acceptable run-through cost; and searching for a path having the lowest run-through cost from the given node to the destination node in the enhanced network topology.

23 Claims, 10 Drawing Sheets

| Reference node | Isle | nodes | | | | | | | | | | | |
|---|---|---|---|---|---|---|---|---|---|---|---|---|---|
| S | $I_S$ | A | B | E | F | G | H | M | $R_1$ | $R_2$ | S | | |
| $R_3$ | $I_{R3}$ | C | D | F | G | H | J | K | L | M | N | O | P | $R_2$ | $R_3$ |
| D | $I_D$ | D | F | G | H | I | J | K | L | N | P | $R_1$ | $R_2$ | $R_3$ |
| ... | | | | | | | | | | | | | |

Fig. 14

| Destination | hops | | | | | Cost |
|---|---|---|---|---|---|---|
| A | S | A | | | | 1 |
| E | S | E | | | | 1 |
| B | S | E | B | | | 2 |
| F | S | E | F | | | 2 |
| G | S | E | F | G | | 3 |
| G | S | E | F | H | G | 4 |
| H | S | E | F | H | | 3 |
| H | S | E | F | G | H | 4 |
| M | S | E | M | | | 2 |
| $R_1$ | S | E | $R_1$ | | | 2 |
| $R_1$ | S | E | F | $R_1$ | | 3 |
| $R_2$ | S | E | $R_2$ | | | 2 |

Fig. 15

| Destination | hops | | | | | Cost |
|---|---|---|---|---|---|---|
| R1 | D | L | R1 | | | 2 |
| R1 | D | K | I | R1 | | 3 |
| R1 | D | L | G | R1 | | 3 |
| R1 | D | K | J | I | R1 | 4 |
| R1 | D | L | G | F | R1 | 4 |
| R2 | D | L | G | N | R2 | 4 |
| R3 | D | L | P | R3 | | 3 |

Fig. 16

| Regenerators | hops | | | | | cost |
|---|---|---|---|---|---|---|
| $R_1, R_2$ | $R_1$ | E | $R_2$ | | | 2 |
| $R_1, R_2$ | $R_1$ | F | $R_2$ | | | 2 |
| $R_1, R_2$ | $R_1$ | G | N | $R_2$ | | 3 |
| $R_1, R_2$ | $R_1$ | F | G | N | $R_2$ | 4 |
| $R_1, R_2$ | $R_1$ | F | G | N | M | $R_2$ | 5 |
| $R_1, R_2$ | $R_1$ | F | H | G | N | $R_2$ | 5 |
| $R_1, R_3$ | - | | | | | - |
| $R_2, R_3$ | $R_2$ | N | P | $R_3$ | | 3 |
| $R_2, R_3$ | $R_2$ | M | C | $R_3$ | | 3 |
| ... | | | | | | |

Fig. 17

| Node type | nodes | | | | | | | | | | | | | |
|---|---|---|---|---|---|---|---|---|---|---|---|---|---|---|
| transparent | A | B | C | D | E | F | G | H | I | J | K | L | M | N | O | S |
| regenerating | $R_1$ | $R_2$ | $R_3$ | | | | | | | | | | | | | |

Fig. 18

OPTIMIZED DYNAMIC ROUTING IN AN OPTICAL NETWORK

CROSS REFERENCE TO RELATED APPLICATION

This application is a national phase application based on PCT/EP2005/012717, filed Nov. 29, 2005.

TECHNICAL FIELD OF THE INVENTION

The present invention relates in general to dynamic routing in a network. In particular, the present invention finds an advantageous, but not exclusive, application in optical telecommunication networks, particularly wavelength-switched and waveband-switched optical telecommunication networks, such as Wavelength Division Multiplexing (WDM) or Dense Wavelength Division Multiplexing (DWDM) optical telecommunication networks, to which the ensuing description will refer, without this implying any loss of generality. In fact, the core concept of the present invention may also be applied equally well to completely different contexts where the best path between two points has to be found according to given criteria, for example signal routing in a semiconductor chip, parcel delivery by post service (DHL, UPS, FedEx, etc.), traffic planning, etc.

BACKGROUND ART

As is known, in the last years one of the key elements in telecommunication networks has been the Wavelength Division Multiplexing (WDM) or the Dense Wavelength Division Multiplexing (DWDM) technology, that allows multiplexing wavelengths for transmission over the same optical fiber, thus increasing the density of transmission channels in a transmission window and thus the overall information carried on a fiber. WDM or DWDM devices are getting an increasing interest due to grow of bandwidth demand in telecommunication networks. They are currently deployed in point-to-point configurations allowing two pieces of equipment to utilize fiber resources in a better way. A more flexible configuration is possible by exploiting wavelength routers, which are devices able to switch wavelength channels without terminating them and that are interconnected by fiber links each carrying a number of wavelength channels. Wavelength routers perform optical/electrical/optical (OEO) conversion on an input signal because, usually, the switching operation is performed using an electrical switching fabric. Such configuration is expensive because it requires to terminate all wavelengths at each intermediate node even if the final destination is elsewhere and then to rebuild the signal towards another intermediate node up to the destination. Cheaper solutions could be obtained eliminating unnecessary OEO conversions in consideration of the fact that technology enhancements are extending the range of an optical signal from tens to hundreds (or thousands) kilometers. New network solutions can be based on wavelength routers with OEO conversion, hereinafter referred to as opaque or regenerating nodes, and/or on wavelength routers without OEO conversion, hereinafter referred to as transparent nodes, and/or on mixed wavelength routers, hereinafter referred to as hybrid nodes, that are only partially equipped with OEO converters.

In a network scenario mainly based on transparent nodes, it is essential to evaluate the feasibility of new paths dynamically established across the network. In such a scenario, there is a maximum length that an optical signal can cover without being regenerated, and this maximum length depends on a lot of factors, such as fiber lengths, fiber types, switching elements features, signal bit-rate, and number of wavelengths. In fact, optical signal degrades along its path due to a lot of physical phenomena such as attenuation, dispersion, non linear effects, etc. that can be called signal impairments. When signal impairments in the optical layer prevent an optical path from being setup a regenerating node is required to flush them. Anyway, carriers prefer to limit the deployment of such equipments in the network, hereinafter referred to. as valuable resources, because expensive.

In traditional regenerating networks, i.e. networks based on regenerating nodes, each node regenerates the optical signal, thereby flushing all signal impairments and thus making it possible to establish an arbitrary path across the network. In such networks, routing methods disregards signal impairments because network design guarantees the feasibility of any path. The main focus in such networks is to find wavelength continuity that is a wavelength that is available from the source to the destination along a certain path throughout the network. If nodes are equipped with wavelength converters, i.e., devices designed to convert a wavelength into another one, this task is easier because it is enough to identify a set of wavelengths that can cover the entire path from the source to the destination.

To reduce costs it is possible to build a transparent optical network that makes use of transparent nodes. However, a real network extending over a sufficiently wide area (e.g., a national environment) can be hardly made completely transparent because of the impairments on optical transmission.

Figure 1:
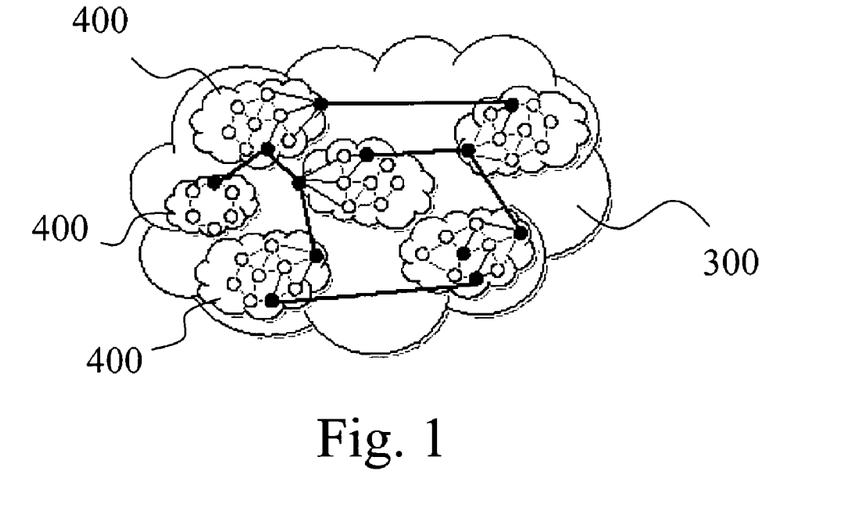
FIG. 1 shows a block diagram of a basic architecture of a translucent optical network.

In practice, the concept of a translucent or hybrid optical network applies, as shown in FIG. 1, which describes a translucent network 300 that can be partitioned into a certain number of transparent sub-networks 400, which are usually referred to as islands (or domains) of transparency. Each island of transparency has an appropriate extension (with respect of the fibers, equipment, etc.) so that inside each island of transparency any lightpath is guaranteed to be feasible. Along the boundary of each island of transparency some regenerating nodes assure the OEO conversion to restore the characteristics of the original signal. This solution in some way avoids the problem of determining which paths are feasible and which ones are not, simply introducing a network architecture that allows only feasible paths. On the other hand, this approach is sub-optimal respect to the resource utilization of the entire network because clients in two different islands of transparency may be close enough to be connected transparently, i.e., the paths between them may be feasible without the use of expensive OEO conversion. Moreover, such an approach is quite static because introducing changes in each sub-network is not easy.

A more dynamical portrait of the situation depicted in FIG. 1 can be obtained looking at the whole optical network as a combination of transparent and regenerating nodes. These ones are deployed in the network following a suitable strategy based on a statistical analysis of traffic, on geographical and demographical data, etc. This picture seems general enough to represent any optical transparent network feasible in practice, allowing services to be supplied at end users in a cheap way. In such networks it is required not only to find an appropriate wavelength that satisfies continuity constrains but also a path that satisfies signal impairment constraints.

The method used to find a path and a wavelength is usually known as Routing and Wavelength Assignment (RWA) problem. There are a lot of research and studies that try to find out a way to solve this problem in a concurrent way or to split it into two sub-problems: the routing problem and the wavelength assignment problem.

Li Bo, C. Xiaowen, K. Sohraby, *Routing and wavelength assignment vs. wavelength converter placement in all-optical networks*, IEEE Optical Communications, pp. S22-S28, August 2003, propose a solution for the RWA problem based on the research of a set of routes between each source-destination pair which is usually the k-shortest link-disjoint paths. If a lightpath connection request arrives at a node it should make a decision to choose a path from the pre-computed set of paths and then assign a free wavelength according to the first-fit method to the selected path. The weight associated to the paths depends not only on the wavelength availability but also on the path length.

K. Taira, Y. Zhang, H. Takagi, S. K. Das, *Efficient Lightpath Routing in Wavelength-Routed Optical Networks*, ICOIN 2002, LNCS 2343, pp. 291-304, 2002, propose a heuristic algorithm that solves the RWA problem. It first solves the routing sub-problem and then the wavelength assignment sub-problem. Both sub-problems are formulated as routing problems and solved using the shortest path routing technique on auxiliary graphs coming from a transformation of the graph associated to the network.

U.S. Pat. No. 6,538,777 discloses a method for allocating channels and paths to connections along candidate channel-paths in a network, where a candidate channel-path comprises a candidate path and candidate channel along the candidate path, and is performed by determining individual effects, on the network, of selecting candidate channel-paths. These include effects on at least one channel-path, other than a candidate channel-path, which shares links with the candidate path. Candidate channel-paths are selected based on the determined effects and allocated. Determination of the effects on the network is based on path capacity. This solution can be used where a single connection has been requested, or alternatively, where multiple connections have been requested. Candidate channel-paths are selected by first calculating a sum of path capacity-dependent values of a set of affected paths in the network for each of plural network states resulting from candidate channel-path allocations, and then selecting the candidate channel-paths yielding a maximum sum.

I. Tomkos, D. Vogiatzis, C. Mas, I. Zacharopoulos, A. Tzanakaki, E. Varvarigos, *Performance engineering of metropolitan area optical networks through impairment constraint routing*, IEEE Optical Communications, pp. S40-S47, August 2004, demonstrate the use of impairment constraint routing for performance engineering of transparent metropolitan area optical network. In particular, this paper shows the relationship between blocking probability and different network characteristics such as span length, amplifier noise figure, and bit rate, and provides information on the system specification required to achieve acceptable network performance.

A solution that takes into account signal impairments is proposed in US2003/0016414, where the path selection and wavelength assignment to a selected path are performed by mapping the wavelength reach to the demand distribution (agile reach) resulting in a increase in the network reach. The network reach is further increased when on-line measured performance data are used for path selection and wavelength assignment. The connections may be engineered/upgraded individually, by optimizing the parameters of the entire path or of a regenerating stretch of the respective path. The upgrades include changing the wavelength, adjusting the parameters of the regenerating stretch, controlling the launched powers, mapping a certain transmitter and/or receiver to the respective wavelength, selecting the wavelengths on a certain link so as to reduce cross-talk, increasing wavelength spacing, etc.

OBJECT AND SUMMARY OF THE INVENTION

The Applicant has observed that the above described prior art is affected by several drawbacks.

With respect to the article of Li Bo et al., the article of K. Taira et al. and U.S. Pat. No. 6,538,777, the Applicant has observed that all these documents identify a possible solution without taking into account the signal impairments. This is acceptable in a regenerating network, i.e., a network with OEO converters, but may not be suitable in a transparent network, i.e., a network without OEO converters.

Regarding the article of I. Tomkos et al., the Applicant has noted that the routing algorithm is based on a metric that depends on the signal impairments and on the traffic matrix (that should be known "a priori") so ensuring the best performance only in a slowly changing scenario.

In connection with US2003/0016414, the Applicant has observed that the proposed solution may result in high block probability in congested networks, since the feasibility of a path is determined only "a posteriori" and therefore cannot be guaranteed. Moreover cost reduction could be not so effective due to the adopted network model that needs OEO conversion in all the nodes of the network.

The objective of the present invention is to provide a dynamic routing that optimizes the exploitation of a WDM translucent network, in particular the utilization of the valuable network resources, e.g. by minimizing usage of OEO converters and/or wavelength converters, that guarantees the feasibility of a path from a signal impairment point of view, and that is flexible enough to follow variable traffic pattern and to adapt to changes in the network topology (e.g. deployment of new equipment).

This objective is achieved by the present invention in that it relates to a routing method for a network and to a network implementing such a routing method, as defined in the appended set of claims.

In particular, the routing method of the present invention achieves the aforementioned objective by carrying out two phases. During the first phase, each network node collects information related to network characteristics such as physical characteristics of optical fibers, equipments, etc., topology and metric information including node types, node capabilities, etc. This information, collected on a dedicated database, can be exploited at least by the network nodes that need to calculate routes within the network according to the method hereafter described.

Such nodes are in charge to find out which other network nodes they can reach without passing through regenerating nodes and which paths connecting to these other network nodes are feasible from a transmission point of view. Moreover, the collected information can be exploited to determine the paths through which the regenerating nodes can reach each other. Based on all this information, each network node can build a simplified network topology that involves the network node itself, the regenerating nodes and the feasible paths therebetween. This simplified network topology, referred to also as "base logical topology" in the following, will be used as starting point to speed up the on-demand path-searches. This first phase is performed once, unless critical changes affecting the simplified network topologies occur in the network (topology changes like node dismantle or new node deployment, signal impairment variations, etc.).

During the second phase, each network node receiving a request to route a signal to another network node searches for a path towards the latter according to a given criterion. In the following, the network node receiving the routing request will be referred to as source node (or root node) and the network node to whom the signal must be sent will be referred to as destination node. If the source node can reach the destination node without passing through regenerating nodes (this information is known from the first phase) it simply selects a path among those ones already searched during the first phase. If the source node can reach the destination node only passing through regenerating nodes, it uses the base logical topology computed during the first phase. Relationships among the destination node and each of the regenerating nodes are added to the base logical topology and then a path is searched according to a carrier's criterion. The second phase is carried out at least once for each different required destination node. Most of the computations and in general most of time consuming activities are concentrated during the first phase because it is involved, in principle, only during the network setup. During such a phase time-consuming activities and therefore a certain delay may be acceptable without affecting the overall network performance. On the contrary, the second phase has to be as quick as possible to reply promptly to the routing requests. This goal is achieved by the method of the present invention.

The present invention refers therefore to a routing method for a network, in particular an optical telecommunication network, including, at least a portion thereof, first type of nodes and second type of nodes, in particular transparent nodes and regenerating nodes. The method first comprises constructing a simplified network topology including a given node, all the second nodes, first paths between the given node and the second nodes and second paths between each couple of second nodes, wherein the first and second paths pass only through first nodes and have an acceptable run-through cost; then, if the given node receives a routing request specifying a destination node that is reachable only through a second node, the method comprises constructing an enhanced network topology by adding to the simplified network topology the destination node and third paths between the destination node and the second nodes that pass only through first nodes and have an acceptable run-through cost, and searching for a path having the lowest run-through cost from the given node to the destination node in the enhanced network topology.

The routing method of the present invention thus comprises the following steps:

for at least a given node among the first and second nodes, searching for a first set of paths between the given node and the second nodes that pass only through first nodes and have associated therewith a run-through cost lower than a predetermined cost;

searching for a second set of paths including the paths between each couple of second nodes that pass only through first nodes and have associated therewith a run-through cost lower than the predetermined cost;

constructing a simplified network topology including the given node, all the second nodes, the first set of paths and the second set of paths;

receiving at the given node a routing request specifying a destination node among the first and second nodes, and if the destination node is reachable from the given node only through a second node:

constructing an enhanced network topology by adding to the simplified network topology the destination node and a third set of paths including the paths between the destination node and the second nodes that pass only through first nodes and have associated therewith a run-through cost lower than the predetermined cost; and searching for a path having the lowest run-through cost from the given node to the destination node in the enhanced network topology.

The method preferably further comprises:

searching for a fourth set of paths including the paths between the given node and the first nodes that pass only through first nodes and have associated therewith a run-through cost lower than a predetermined cost.

Moreover, the method may further comprise, if said destination node is reachable from said given node through a path of the fourth set, the step of:

searching for a path having the lowest run-through cost from the given node to the destination node in the fourth set of paths.

Alternatively, if the destination node is reachable from the given node through a path of the fourth set, the method may comprise:

searching for a path having the lowest run-through cost from the given node to the destination node in both the fourth set of paths and the enhanced network topology.

The step of searching for a path having a lowest run-through cost from the given node to the destination node in both the fourth set of paths and the enhanced network topology may comprise:

selecting the path in the fourth set of paths having the lowest run-through cost from the given node to the destination node;

selecting the path in the enhanced network topology having the lowest run-through cost from the given node to the destination node, and comparing the path in the fourth set of paths having the lowest run-through cost with the path in the enhanced network topology having the lowest run-through cost.

The method may further comprise, after receiving at the given node a routing request specifying a destination node, checking if the destination node is reachable from the given node through a path of the fourth set.

Each path preferably comprises at least a network transmission resource and the method may further comprise excluding from the enhanced network topology a path if it comprises at least an unavailable network transmission resource.

The method preferably comprises also updating a routing database with the paths of the first, second, third and fourth set of paths.

The method may further comprise:

monitoring the network to determine variations in the topology that may affect the availability of at least one path in the simplified network topology; and re-constructing a simplified network topology for the given node if the variations are determined.

Alternatively or in addition, the method may comprise:

monitoring the network to determine variations in the topology that may affect the availability of at least one path in the enhanced network topology; and re-constructing an enhanced network topology for the given node if the variations are determined.

The method may further comprise:

monitoring the network to determine variations in the resource availability that may affect the availability of at least one path in the fourth set of paths.

The method preferably comprises also the step of:

analyzing said network to discriminate the first nodes from the second nodes.

Moreover, the method preferably comprises also the step:

analyzing the network to determine network properties including the topology and the run-through costs associated with the paths.

In one possible embodiment, the first set of paths, the second set of paths and the third set of paths are searched by the given node. Also the fourth set of paths may be searched by the given node.

The network here considered is preferably a telecommunication network, more preferably an optical telecommunication network. The optical telecommunication network may be a wavelength-switched optical telecommunication network and all the first and second nodes can be configured to convert signal wavelengths.

Preferably, the first nodes are configured to transmit signals without regeneration and the second nodes are configured to transmit signals with regeneration.

The first and second nodes may comprise border nodes directly connected to client equipments, and the step of constructing a simplified network topology may be performed for each of the border nodes. In addition or in alternative, the step of constructing an enhanced network topology may be performed for each of the border nodes.

The run-through cost is preferably a signal impairment and the predetermined cost is preferably a maximum admissible signal impairment.

The present invention also relates to a network configured to perform the routing method as previously described.

The network is preferably a telecommunication network. The first nodes are preferably signal non-regenerating nodes, and the second nodes are preferably signal regenerating nodes. More preferably, the telecommunication network is an optical telecommunication network. Still more preferably, the optical telecommunication network is a wavelength-switched optical telecommunication network, in particular a wavelength division multiplexing (WDM) or a dense wavelength division multiplexing (DWDM) optical telecommunication network, wherein the first nodes are configured to convert signal wavelengths without electronic conversion, and the second nodes are configured to convert signal wavelength through optical/electrical/optical conversion of an input optical signal and to regenerate the electrical signal.

Finally, the present invention relates to a data processing system comprising means adapted to carry out the steps of the above method, and to a computer program comprising instructions for carrying out all the steps of the above method when said computer program is executed on a computer system.

BRIEF DESCRIPTION OF THE DRAWINGS

For a better understanding of the present invention, preferred embodiments, which are intended purely by way of example and are not to be construed as limiting, will now be described with reference to the attached drawings, wherein.

DETAILED DESCRIPTION OF PREFERRED EMBODIMENTS OF THE INVENTION

The following discussion is presented to enable a person skilled in the art to make and use the invention. Various modifications to the embodiments will be readily apparent to those skilled in the art, and the generic principles herein may be applied to other embodiments and applications without departing from the spirit and scope of the present invention. Thus, the present invention is not intended to be limited to the embodiments shown, but is to be accorded the widest scope consistent with the principles and features disclosed herein and defined in the attached claims.

Figure 5:
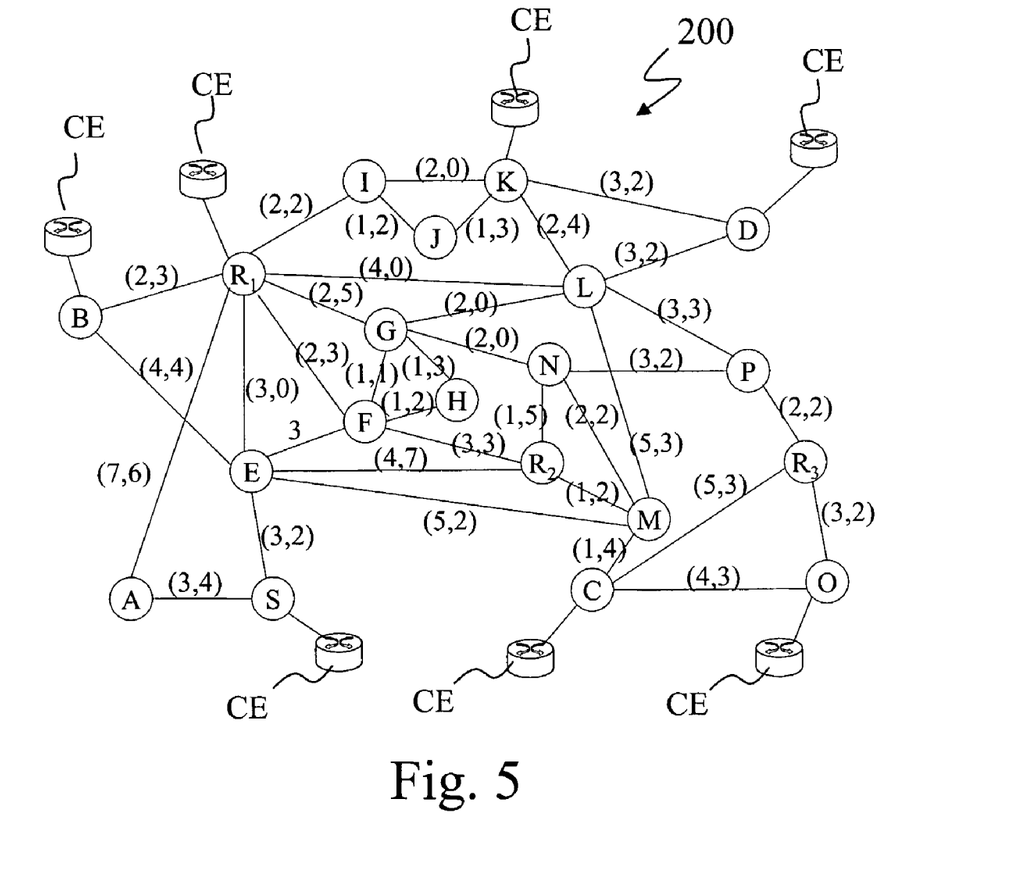
FIGS. 5 to 13 show different network graphs computed during the first and second phases of the dynamic routing of the present invention.

The dynamic routing according to the present invention will now be described with reference to an arbitrary translucent network of the type shown in FIG. 5, i.e. a translucent network 200 based on at least two different network nodes. Preferably the two types of nodes are the following:

signal regenerating nodes, or "opaque" nodes, depicted in FIG. 5 as grey circles, and designated by the letter R; these nodes perform electrical signal regeneration and comprise digital cross connect switches; and "transparent" nodes, depicted in FIG. 5 as white circles, and designated by the other letters of the alphabet; these nodes are not able to regenerate the signals and comprise optical lambda switches.

In particular, optical lambda switches are network equipments that are able to change the signal wavelength (lambda) without electronic conversion, while digital cross connect switches are network equipments that add to the capability of the optical lambda switches the capability to electronically regenerate an input optical signal.

In the translucent network shown in FIG. 5, independently of the distinction between transparent nodes and regenerating nodes, nodes can also be classified in two classes: border nodes and core nodes. Border nodes have at least one attached client node whilst core nodes have no attached client node and for that reason they can have a subset of the routing capability that border nodes have.

Client nodes are for example routers and are hereinafter called "client equipment" and indicated with CE in FIG. 5. Client equipments CE are connected to the border nodes by transporders (not shown) with the objective to have signals with well known characteristics (launched power, modulation format, wavelength, etc.) that are required for routing. Alternatively, connections can be done transparently but in this case border nodes should know the characteristics of the signals received from the client equipments.

The nodes of system 200 are connected together through links, represented by arcs. Each arc connecting a couple of nodes represents a WDM or DWDM connection able to convey a certain number of wavelengths. In the example depicted here, each arc is associated with a couple of numbers, wherein the first one is a weight that represents a synthesis of all signal impairments (i.e., a run-through cost) along the arc, whereas the second one is a logical cost for the arc, e.g., based on the number of available wavelengths along the arc and/or other parameters of interest for a carrier.

The assumption that the optical lambda switches are able to change the signal wavelengths (i.e., to convert input wavelengths into different output wavelengths) without electronic conversion, introduces a lot of flexibility because the path can be selected by the routing process whilst the wavelength assignment problem can be reduced to the choice of an arbitrary wavelength among those ones available at the source node (e.g., First Fit method). In a more realistic scenario, only some of the optical switches are (and probably only partially)

equipped with wavelength converters (i.e., a sparse conversion scenario), and therefore there is the need to select a wavelength along the way to exploit wavelength converters in the best way and to reduce the blocking probability. At least two possible scenarios could be taken into account, namely one in which nodes know how many and which wavelengths are available at each link, and one in which nodes just know how many wavelengths are available at each link. In the first case there are known methods in the literature to identify the best subset of wavelengths to be used along the path, whilst in the latter case it is possible to identify the subset of wavelengths to be used along the path by signaling, e.g. by the resource ReSerVation Protocol with Traffic Engineering (RSVP-TE) for Generalized Multiprotocol Label Switching (GMPLS) that can identify a set of wavelengths that fit with wavelength constrains along a path.

Each network node collects and spreads out routing information that may range from topology and metric to resource availability. In addition, signal impairments of all links have to be taken into account to enable the nodes to calculate a feasible path in the translucent network.

As previously mentioned, the dynamic routing of the present invention includes two phases. During the first phase, each node of the network (or, possibly, only a predetermined subset of them) collects information related to network characteristics in a network database DB. Based on the collected information, each border node can know which other (transparent and regenerating) nodes it can reach without passing through regenerating nodes and along which paths, and which other nodes it cannot reach. Moreover, border nodes can know also the ways regenerating nodes can reach each others. Based on this information, each border node builds a simplified network topology, referred to also as "base logical topology", that involves itself, the regenerating nodes and the feasible paths therebetween. This first phase is performed once, during the setup of the network, and the information so obtained can be updated each time a change occurs in the system that can affect the above node relations (topology changes, signal impairment variations, etc.). Although here and in the following it is assumed that the above phase about base logical topology construction is performed only for the border nodes of the network, the system could also be configured to have this phase performed by other groups of nodes in accordance to the particular routing architecture adopted. Moreover, it can be appreciated that the steps of the first phase can be performed locally by the nodes, or centrally by a properly configured unit in communication with the nodes.

During the second phase, network nodes that receive a request to route a signal, i.e. source nodes, compute a path towards the specified destination nodes. If a source node can reach the destination node without using regeneration (this information is known to the source node from the first phase) it may simply select a path among those ones already computed during the first phase according to a certain carrier's criterion (e.g. least congested path, shortest path, etc.). If a source node needs to regenerate the signal along the path towards the destination node, it uses the base logical topology built during the first phase. Relationships among the destination node and each of the regenerating nodes are added to the base logical topology and then a path is searched according to carrier's criteria.

Figure 2:
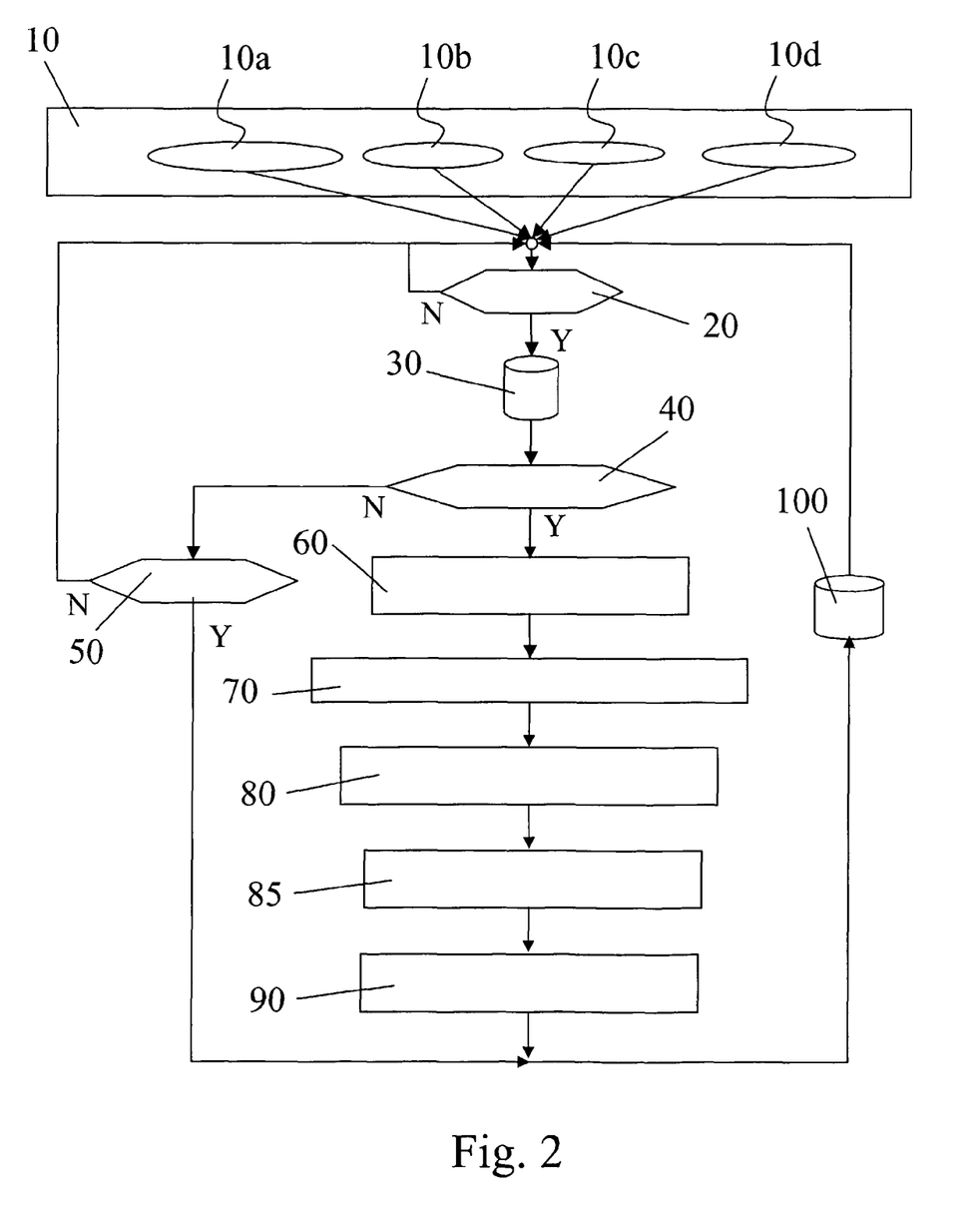
FIG. 2 shows a flowchart of a first phase of the dynamic routing according to the present invention.
Figure 3:
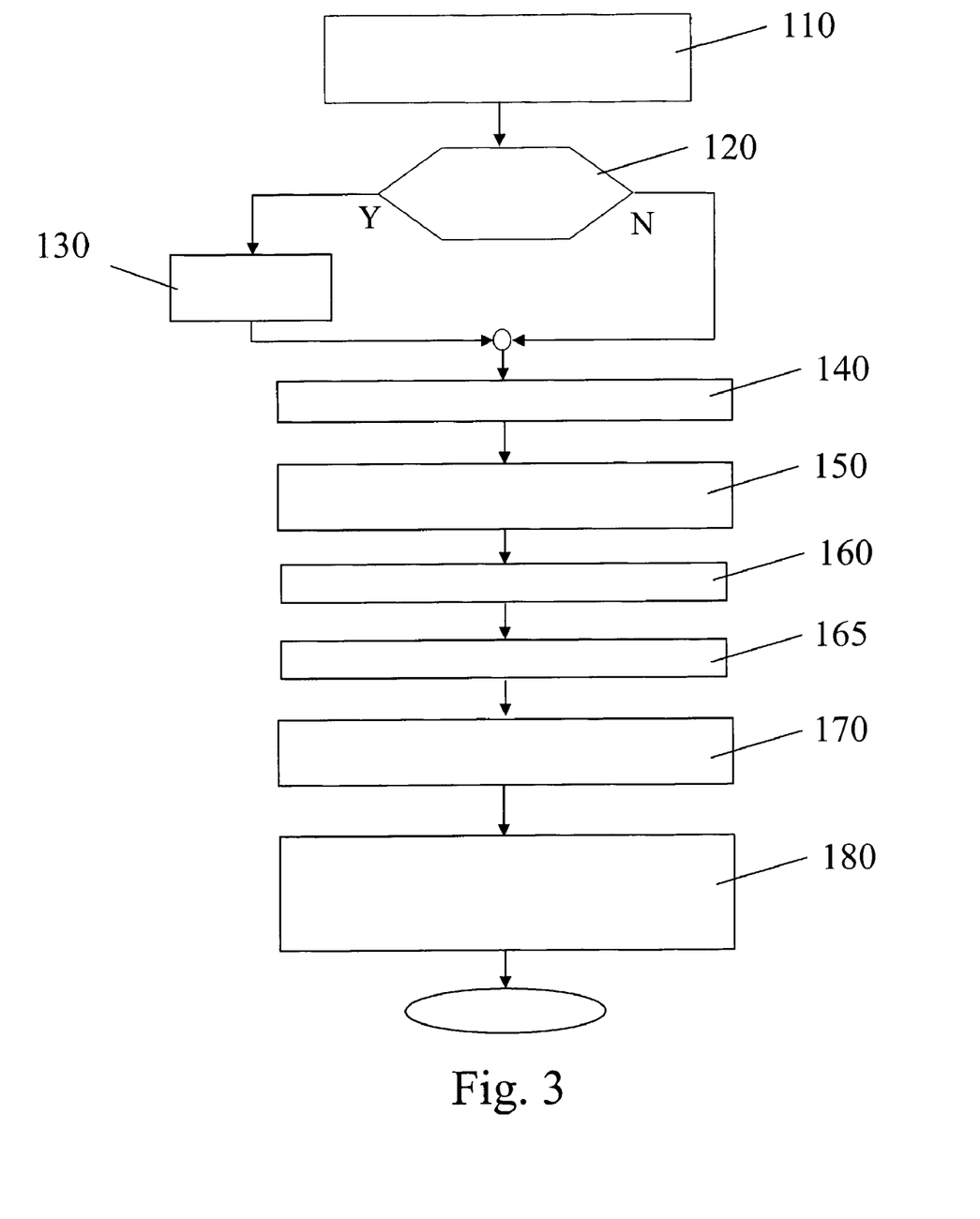
FIG. 3 shows a flowchart of a second phase of the dynamic routing according to an embodiment of the present invention.

FIGS. 2 and 3 show flowcharts relating to the dynamic routing according to the present invention, wherein FIG. 2 relates to the first phase of the dynamic routing, whilst FIG. 3 relates to the second phase of the dynamic routing.

As anticipated above, the dynamic routing according to the present invention may be implemented in an optical network with either a distributed architecture, i.e., an architecture in which functionalities (i.e. routing, signaling, etc.) are implemented in the nodes, a centralized architecture, i.e., an architecture in which all the steps are performed by a dedicated central unit that makes the results available for the routing operations, or a hybrid architecture, i.e., an architecture in which some functionalities are distributed and others are centralized. The following description will be made with reference to a distributed architecture, being it understood that what will be described might alternatively be implemented by a centralized processing system.

With reference to FIG. 2, initially network nodes collect information (block 10) related to network characteristics (10a) such as signal impairments of fibers, equipments, etc., information related to the network topology (10b) such as node types, node capabilities, link type, link capabilities, relationships among nodes, etc., information related to the network metric (10c) such as link costs, and information related to resources availability (10d) (e.g. wavelengths and regenerators).

When some changes occur in the network, such as new node deployment or removal, wavelengths and/or regenerators availability changes, each node participating to the routing process evaluates the need of updating its database DB (block 20), and, if the update is needed (exit Y from block 20), they update the database DB with the topology changes and spread out the network changes to the other nodes in the network (block 30). On the contrary, if the update is not needed (exit N from block 20), nothing is done.

If the database DB has been updated, each border node evaluates the need of re-computing a feasible paths list contained in a routing database RDB (block 40). The routing database RDB can be centralized or distributed; in the present case it is distributed. For the purposes of the present invention, a path is considered a "feasible path" if it satisfies a signal impairment criterion and if it doesn't traverse valuable resources, i.e. regenerating nodes $R_i$. Such paths therefore don't use regeneration resources and for that reason they can be classified as transparent paths. In the present step, therefore, each border node evaluates if the variation in the network topology invalidates the current feasible paths list. If not (exit N from block 40), each border node then evaluates the expediency of simply updating the routing database RDB (block 50). If yes (exit Y from block 50), the routing database RDB is updated (block 100). If not (exit N from block 50), nothing is done. For example, it may be expedient to update the routing database RDB instead of completely re-computing it when simple modification in bandwidth availability, regeneration availability or link failure occur, so saving processing resources.

Figure 6:
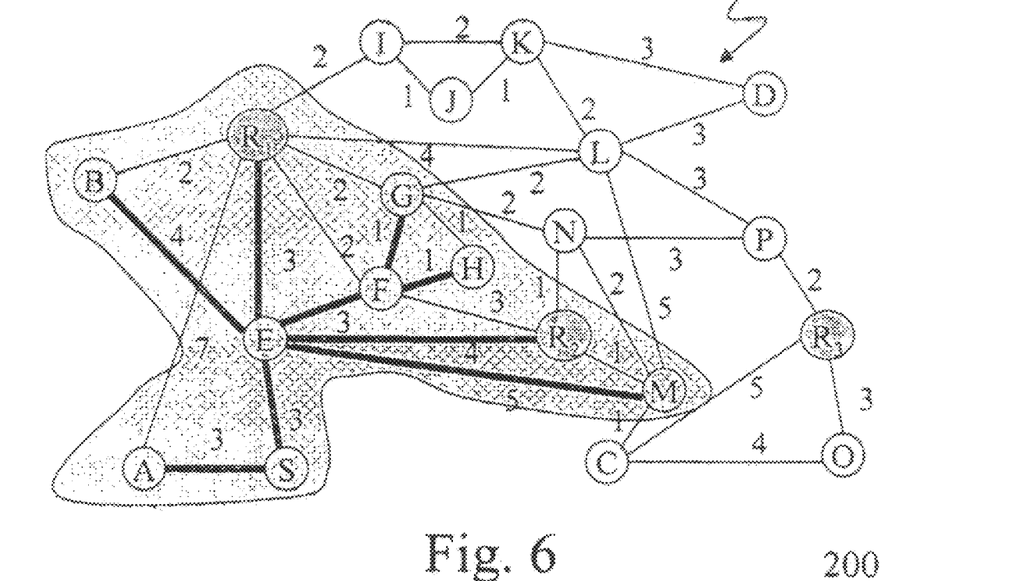
Figure 7:
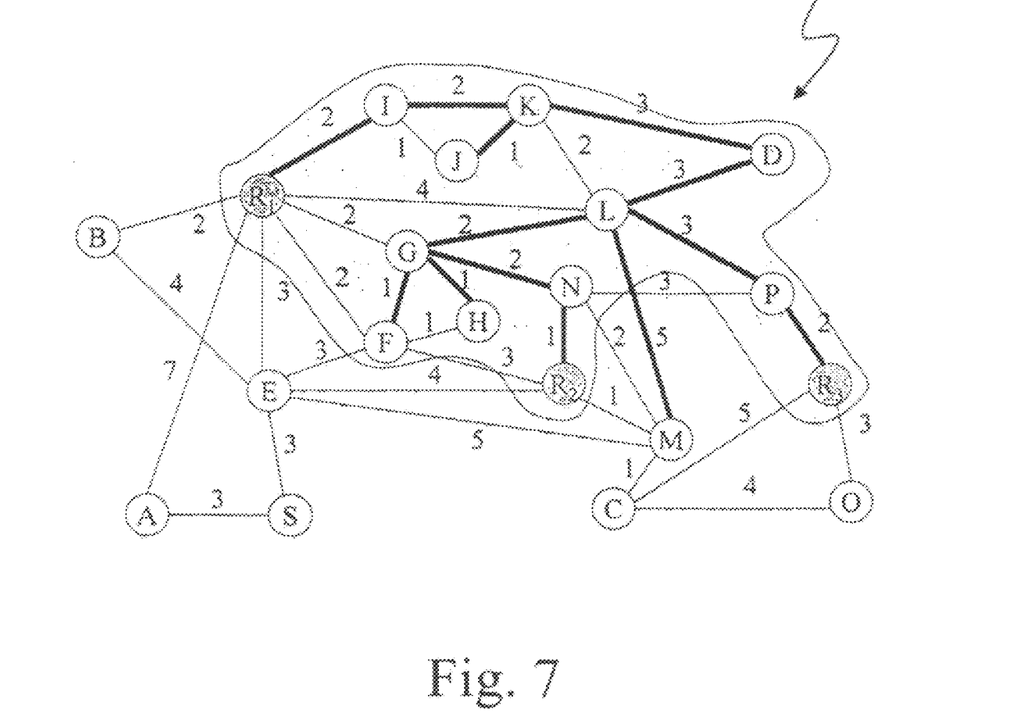
Figure 8:
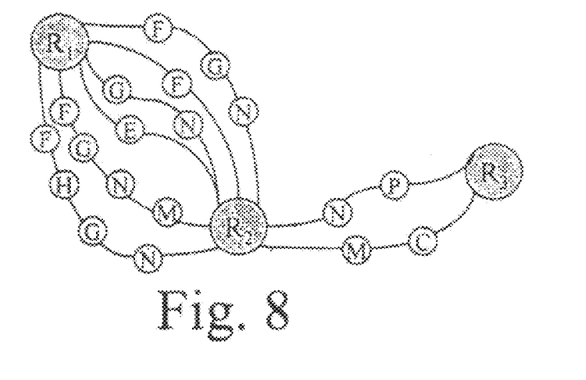
Figure 10:
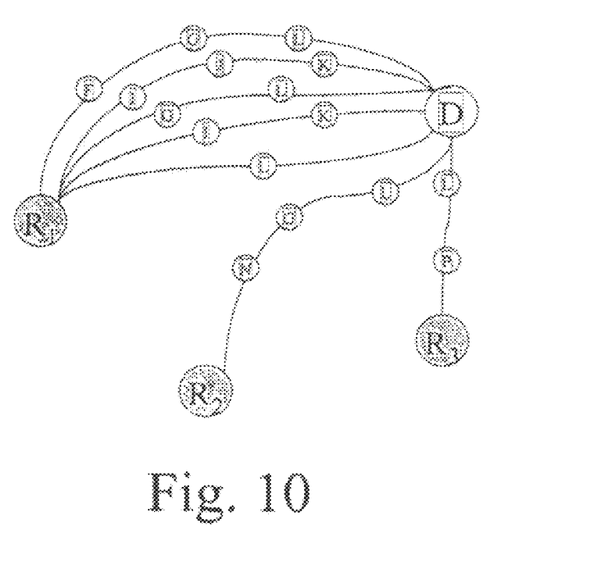
Figure 14:
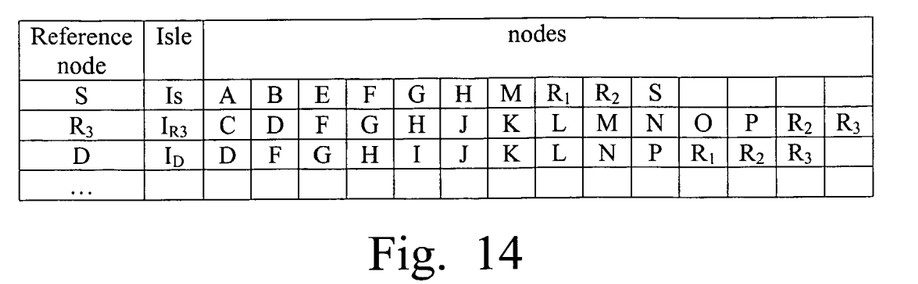
FIGS. 14 to 18 show different tables computed during the first and second phases of the dynamic routing of the present invention.
Figure 15:
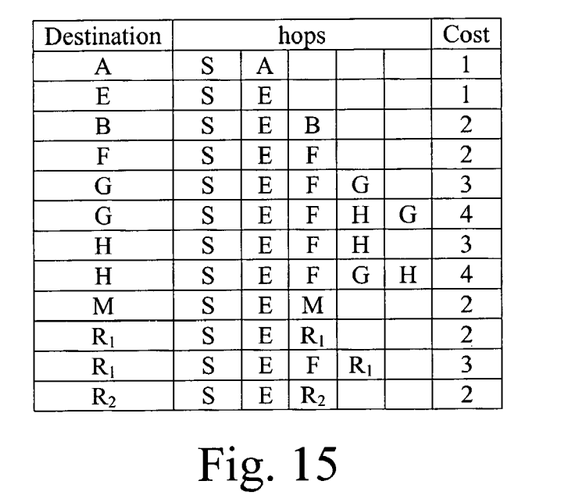
Figure 16:
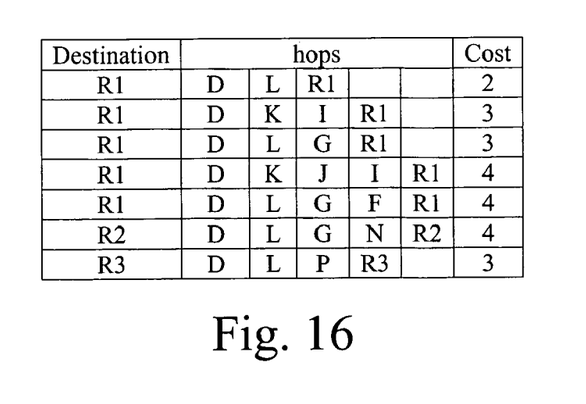
Figure 17:
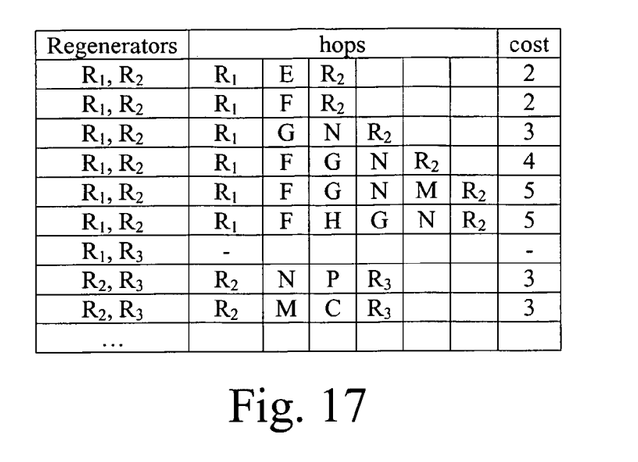
Figure 18:
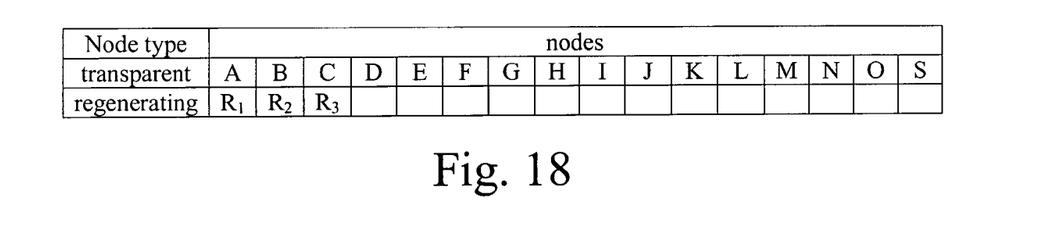

When new routing information requires re-computation of the routing database RDB (exit Y from block 40), each border node carries out the following steps:

classifying all network nodes according to their type, thus discriminating the transparent nodes (optical lambda switches) from the regenerating nodes (digital cross connect switches) (block 60). FIG. 18 shows a table that lists all the nodes of the network and their typology;

searching for all the network nodes (block 70) that, taking account of the signal impairments, the border nodes and the regenerating nodes can reach without traversing valuable resources (e.g. OEO regenerating nodes $R_i$) and without exceeding a maximum prefixed signal impairment (run-through cost). Hereinafter, this group of nodes will be referred to as "isle of reachability" associated with the considered border or regenerating node. The "isle of reachability" of the regenerating nodes could be alternatively computed by a central server and the results furnished to the border nodes. As examples, FIGS. 6 and 7 show the isles of reachability $I_S$ and $I_D$ (grey areas) associated with the nodes S and D, respectively; in these two figures, the weights associated with the arcs represent signal impairments and it is assumed that the maximum allowed cumulated weight along the path is 8 (in arbitrary units). For simplicity only the signal impairments weights have been showed. Different parameters or a combination of them can be used as signal impairments weights (a brief discussion and some bibliography's references are shown in the above mentioned article of I. Tomkos et al). The method here shown is independent from the weights adopted. The only requirement is that they can be added linearly. FIG. 14 shows a table listing the network nodes belonging to the isles of reachability $I_S$, $I_D$, and $I_{R3}$ associated with the nodes S, D, and $R_3$, respectively, in the translucent network of FIG. 5;

searching for feasible paths between the border node and each other node in the isle of. reachability associated to the border node, using, for example, an exhaustive algorithm or a k-shortest paths algorithm (block 80). These feasible paths therefore comprise a set of paths between the border node and the transparent nodes that pass only through first nodes and have associated therewith a run-through cost lower than a predetermined cost (maximum allowable signal impairment) and another set of paths between the border node and the regenerating nodes that pass only through first nodes and have associated therewith a run-through cost lower than the predetermined cost. Optionally, for each node in the isle of reachability associated with the border node, the feasible paths may be ordered according to a given criterion, for example a preferred carrier's metric defined by number of hops, wavelength availability, number of wavelength conversions or a combination of them. As an example, FIG. 15 shows a table listing all feasible paths between the border node S and each other node in the isle of reachability $I_S$ shown in FIG. 6, wherein for each destination node, paths are ordered according to a preferred carrier's metric, e.g. the number of hops, indicated as a cost value;

optionally, each border node can calculate the isle of reachability for every other border node in the network, identify the regeneration nodes inside the calculated isles of reachability, and calculate all feasible paths between the border nodes and the regeneration nodes within each isle of reachability (block 85). As an example, FIG. 10 shows a graph in which all feasible paths between the border node D and each regenerating node in the isle of reachability $I_D$ are depicted, whereas FIG. 16 shows a table listing such all feasible paths, wherein, for each destination node, paths are ordered according to the number of hops;

searching for the set of all feasible paths (passing only through transparent nodes) between each couple of regenerating nodes $R_i$, $R_j$ in the translucent network (block 90). As an example, FIG. 8 shows a graph in which all feasible paths between each couple of regenerating nodes $R_i$, $R_j$ in the translucent network 200 are depicted, whereas FIG. 17 shows a table listing such all feasible paths, wherein, for each destination node, paths are ordered according to the number of hops; and updating the feasible paths list in the routing database RDB with the paths computed in the previous two (or optionally three) steps (100).

It is implicit in the foregoing that the steps from 60 to 100 are performed for the first time when the system is set up (and then repeated each time the feasible paths list must be recomputed).

As to the computation of the isles of reachability, nodes in each isle of reachability may be selected using a modified Dijkstra algorithm that organizes the network nodes in a tree structure and breaks a branch off when the accumulated weight along the branch, that represents the signal impairments of the branch, exceeds a fixed value (set to 8 units in the considered example). After running the algorithm, all nodes in the computed Dijkstra tree belong to the isle of reachability, and for all these nodes at least one feasible path exists (from a transmission point of view) from the source node (e.g. node S).

Partition of the translucent network of FIG. 5 into isles of reachability associated to each network node may reduce the number of network nodes involved in the feasible paths list search, and therefore an exhaustive (and not scalable) algorithm may also be applied with satisfactory performance. In particular, the number of network nodes involved in the search of feasible paths list between a couple of network nodes may be reduced to those ones belonging to the intersection of the isles of reachability associated to the two network nodes. The step of instersecting the isles of reachability of the two considered nodes can be performed, for example, before the searching steps of blocks 80, 85 and 90, which therefore can be limited to the resulting intersection areas.

At the end of the first phase of the dynamic routing of the present invention, each border node knows all the feasible paths towards every other node inside its isle of reachability, all the feasible paths between each couple of regenerating nodes $R_i$, $R_j$ and, optionally, all the feasible paths between a generic border node and each of the regenerating node inside the isle of reachability associated to that generic border node.

With this information, each border node is now able to build the base logical topology, which is simpler than the original topology and is based on the considered network node itself, the regenerating nodes and the relationships (arcs) between them. Each border node performs the same procedure and gets to a corresponding base logical topology.

Figure 9:
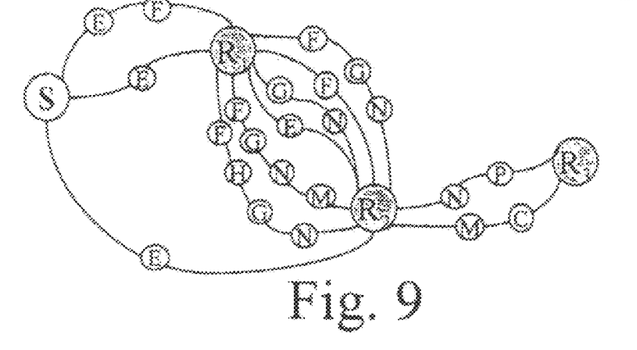

As an example, FIG. 9 shows the base logical topology from the perspective of the border node S in the network 200. In particular, FIG. 9 is based on the tables of FIGS. 14, 15, 17 and 18. In fact, table in FIG. 14 shows that regenerating nodes $R_1$ and $R_2$ belong to the isle of reachability of source node S and therefore that the latter may reach regenerating nodes $R_1$ and $R_2$ via a transparent path (i.e., without passing through another regenerating node). Table in FIG. 18 highlights another regeneration node $R_3$ (besides $R_1$ and $R_2$) that does not belong to the isle of reachability of source node S but that must be added to the base logical topology. This topology must be completed by adding the relationships among regenerating nodes (already calculated in FIG. 2 block 90 and showed in FIG. 8 and the corresponding table in FIG. 17) and among source node and regenerating nodes (already calculated in FIG. 2 block 80 and showed in the table in FIG. 15).

FIG. 3 shows the flowchart relating to the second phase of the dynamic routing according to an embodiment of the present invention, i.e., the search of the path between a generic source node S that receives a routing request and a generic destination node D, via regeneration nodes $R_j$ and other generic network nodes Ni (A, B, C, . . . ).

Figure 11:
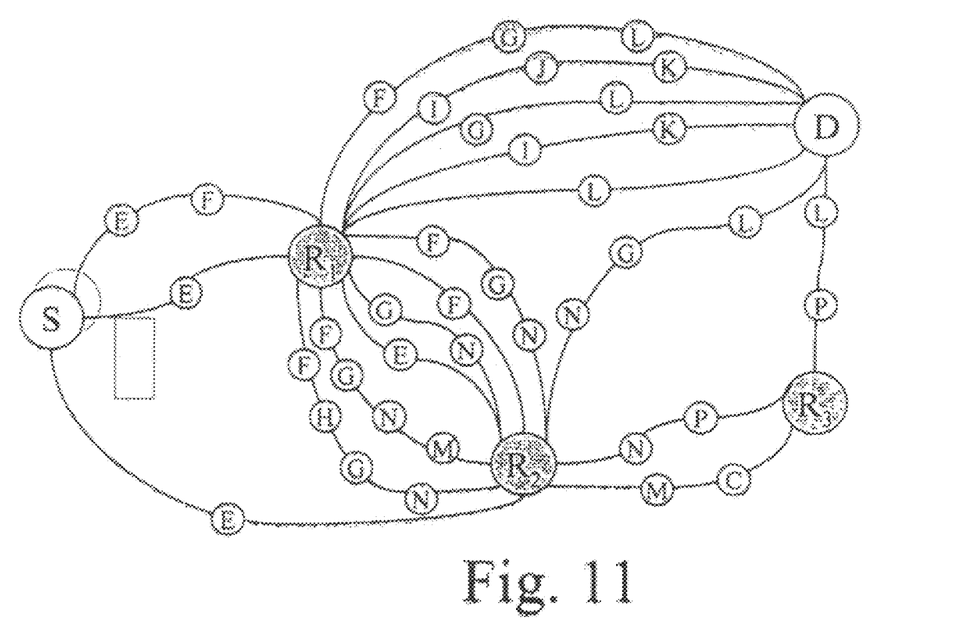
Figure 11A:
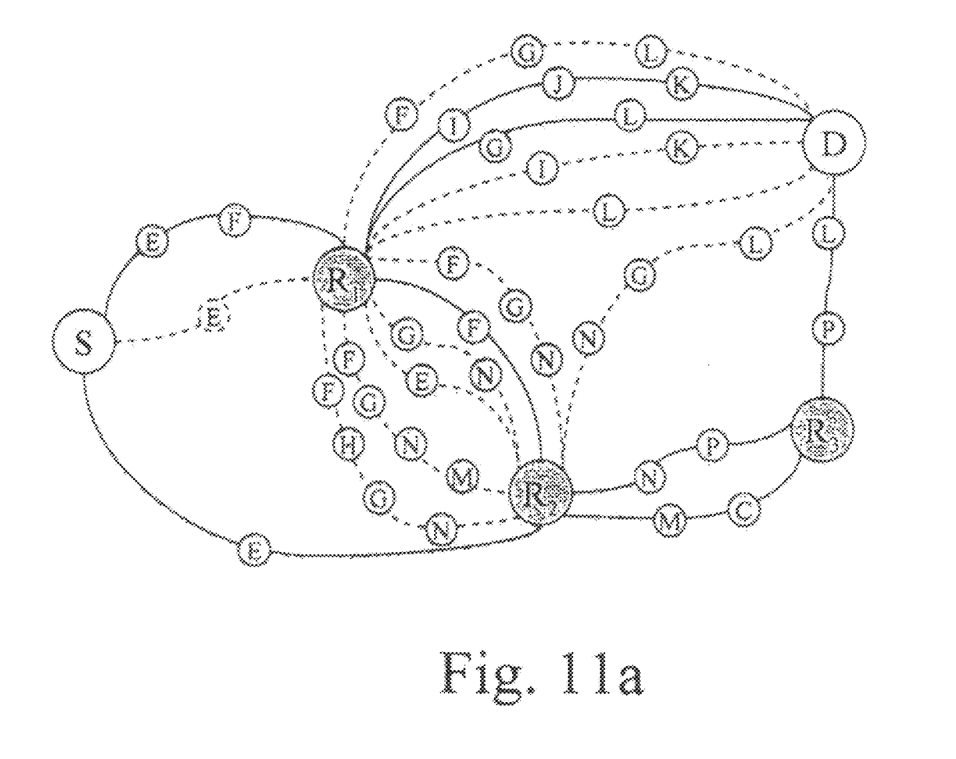
Figure 12:
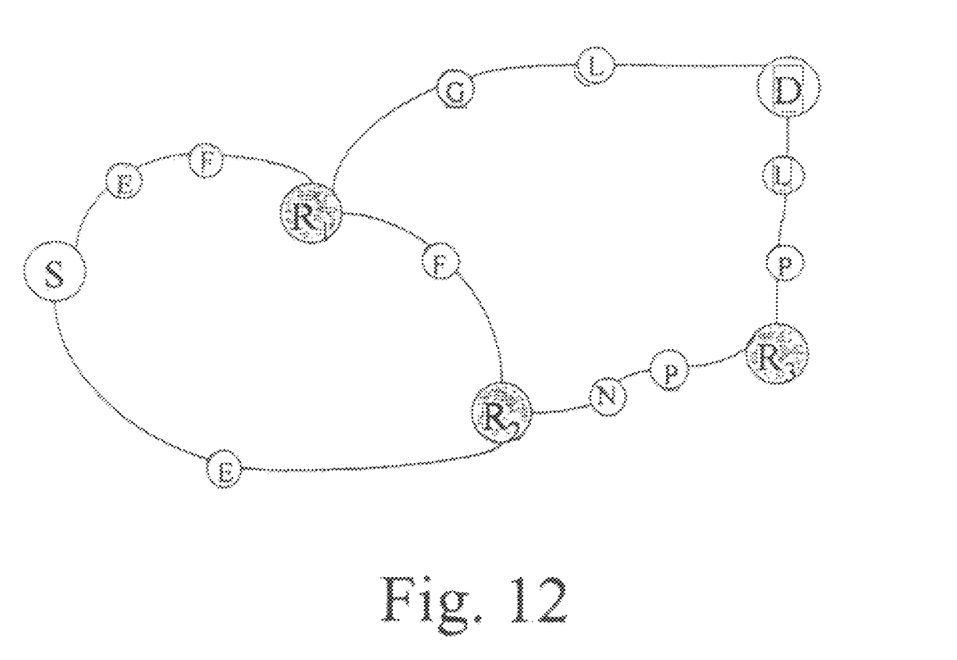
Figure 13:
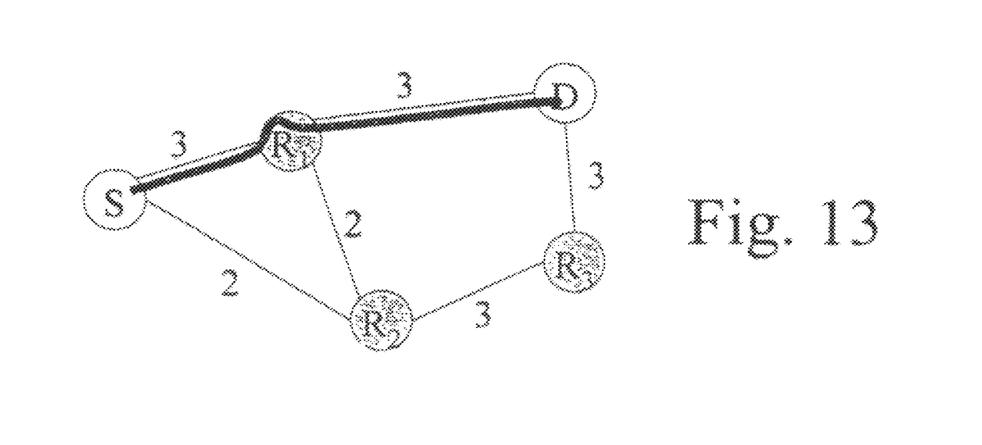

As shown in FIG. 3, when a request in made to node S to route a signal to a destination node D, i.e. when a request is made to search a path between a source node S and a destination node D (block 110), with or without constraints, the main steps of the path search that are carried out are:

checking if the destination node D is in the isle of reachability $I_S$ associated with the source node S (block 120);

if not (exit N from block 120), performing the step described hereinafter with reference to block 140;

if so (exit Y from block 120), choosing the best pre-computed path (if available) in the feasible paths list stored in the routing database RDB (block 130), based on carrier's metric and already calculated during the first phase (block 80). This case doesn't make use of valuable resources, i.e. OEO regenerating nodes, and therefore during this step the procedure just verifies the availability of resources along the different feasible paths already computed during the first phase;

search all regenerating nodes $R_i$ in the isle of reachability $I_D$ associated with the destination node D (block 140) if not already accomplished during the first phase;

determining, for each regenerating node $R_i$ in the isle of reachability $I_D$ associated with the destination node D, the set of all paths from the regenerating node $R_i$ to the destination node D that are feasible from a signal impairments point of view and without using valuable resources (block 150), i.e. the paths between the regenerating node $R_i$ and the destination node D passing only through first nodes and having associated therewith a run-through cost lower than the maximum allowable cost, if not already accomplished during the first phase. As an example, FIG. 10 shows the feasible paths between regenerating nodes $R_1$, $R_2$ and $R_3$ and the destination node D in the network shown in FIG. 7;

building a network topology, hereinafter referred to as "enhanced logical topology" or "enhanced network topology", based on the base logical topology, by performing the following steps (block 160):

adding the destination node D, the regenerating nodes $R_i$ in the isle of reachability $I_D$ associated with the destination node D, and the set of paths between the destination node D and the regenerating nodes $R_i$ in the isle of reachability $I_D$ (graph of FIG. 10) to the base logical topology associated to the source node S (graph of FIG. 9). FIG. 11 shows the "enhanced logical topology" obtained by merging the graphs of FIGS. 9 and 10, wherein the nodes S, D, $R_1$, $R_2$ and $R_3$ are connected by arcs including one or more transparent nodes;

for each arc in the enhanced logical topology, identifying the availability of resources along the arc; and if unavailable resources are identified along an arc, remove the arc. The arcs with unavailable resources are represented in FIG. 11*a* by dotted lines;

for each couple of nodes in the enhanced logical topology, searching for the best available path associated with the arcs, according to carrier's metric. FIG. 12 shows the resulting enhanced logical topology and the best selected paths between source node S and regenerating nodes $R_1$, $R_2$ and $R_3$, between the regenerating nodes $R_1$, $R_2$ and $R_3$ and between the regenerating nodes $R_1$, $R_2$ and $R_3$ and the destination node D (block 165); and selecting the best path (if any) across the enhanced logical topology between source node S and destination D, according to carrier's metric (block 170). This is a solution that does make use of valuable resources, i.e., OEO regenerating nodes. FIG. 13 shows the enhanced logical topology of FIG. 12, wherein real paths (i.e. arcs including intermediate nodes) between source node S, regenerating nodes $R_1$, $R_2$, $R_3$ and destination node D have been replaced by corresponding elementary arcs and costs, and wherein the best path between source node S and destination node D (i.e., the one having the lower run-through cost, in this case the one passing through $R_1$) is represented by a bold line. If the destination node D is in the isle of reachability $I_S$ associated with the source node S, the best path is selected between the path chosen in the feasible paths list (block 130) and worked out during the first phase (block 80) and the path chosen in the enhanced logical topology (block 170) according to carrier's criteria (block 180).

Figure 4:
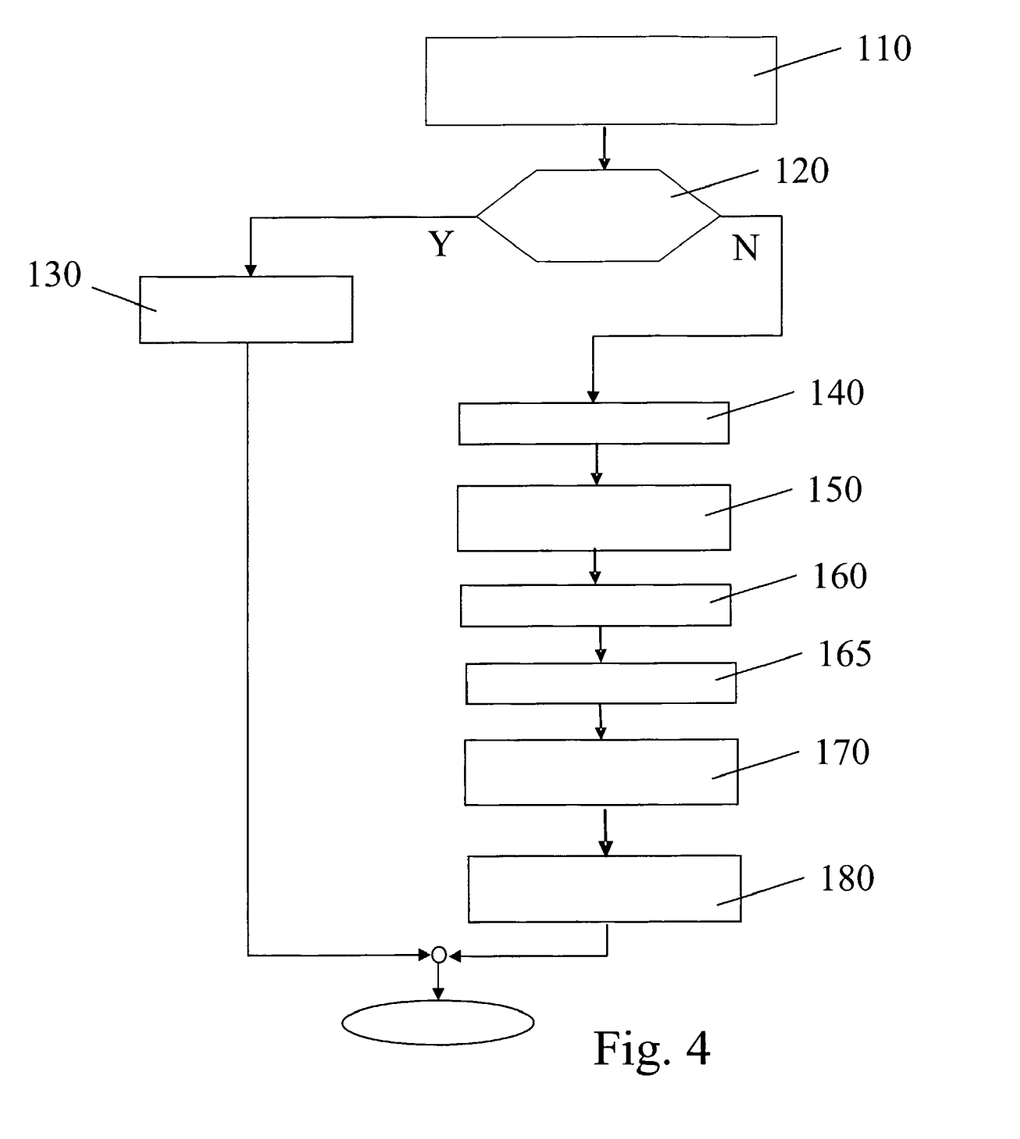
FIG. 4 shows a flowchart of the second phase of the dynamic routing according to a different embodiment of the present invention.

FIG. 4 shows a flowchart of a different embodiment of the second phase of the dynamic routing according to the present invention, which embodiment differs from the one previously described with reference to the flowchart shown in FIG. 3 only in that if the destination node D is in the isle of reachability $I_S$ associated with the source node S (block 120) and the search for the best pre-computed path among those stored in the routing database RDB is successful (block 130), the second phase ends without performing the steps previously described with reference to blocks 140-180.

The advantages of the present invention are evident from the foregoing description.

In particular, one point of strength of the present invention is that it allows low blocking probability to be achieved also in a congested network where signal impairments are considerable and few regenerating nodes are available.

Another point of strength of the present invention is the capability to handle variations in the number of nodes and/or links inside the network during operational service without invalidate the routing method. This is for example a considerable limitation in all those routing architectures that are based on a network that is split in isles of transparency (sub-networks of limited geographic size that are optically isolated from other parts of the Optical Layer by transponders) for routing purpose. In such networks routing is strictly related to network design and it is hard to modify the topology after the deployment without compromising the routing rules.

It is clear that numerous modifications and variants can be made to the present invention, all falling within the scope of the invention, as defined in the appended claims.

For example, in the second phase, the steps of checking if the destination node D is in the isle of reachability $I_S$ associated with the source node S (block 120) and, in the positive, choosing the best pre-computed path in the feasible paths list (block 130), could be omitted, and the best path be calculated only in the enhanced logical topology irrespective of the position of node D. Moreover, although the present invention has been disclosed with reference to a telecommunication network, it can be appreciated that the same technique can possibly be applied to different contexts; in particular it is an optimized routing technique that can be applied any time the shortest route between two points has to be found. Other possible applications are, for example, parcels delivery by post service (DHL, UPS and similars), or signals routing in a chip, or road traffic planning. In general, the above described signal impairment criterion can be considered as the requirement that the run-through cost along the considered path is lower than a maximum allowable run-through cost.

It can also be appreciated the method of the present invention can be applied to any predetermined portion of a network including nodes of a first type and of a second type, in particular optical telecommunication networks including transparent nodes and regenerating nodes. The method can be applied for example in a local area of a network.

The invention claimed is:

1. A routing method for a network, said network having a topology with at least first and second nodes connected together through links, said first nodes having different properties from said second nodes, said links forming paths for said routing and said paths having associated therewith respective run-through costs, comprising:
for at least a given node among said first and second nodes, searching for a first set of paths between said given node and said second nodes that pass only through first nodes and have associated therewith a run-through cost lower than a predetermined cost;
searching for a second set of paths comprising the paths between each couple of second nodes that pass only through first nodes and have associated therewith a run-through cost lower than said predetermined cost;
constructing a simplified network topology comprising said given node, all said second nodes, said first set of paths and said second set of paths; and
receiving at said given node a routing request specifying a destination node among said first and second nodes; and
if said destination node is reachable from said given node only through a second node:
constructing an enhanced network topology by adding to the simplified network topology said destination node and a third set of paths comprising the paths between said destination node and said second nodes that pass only through first nodes and have associated therewith a run-through cost lower than said predetermined cost; and
searching for a path having the lowest run-through cost from said given node to said destination node in said enhanced network topology.

2. The method of claim 1, further comprising:
searching for a fourth set of paths comprising the paths between said given node and said first nodes that pass only through first nodes and have associated therewith a run-through cost lower than a predetermined cost.

3. The method of claim 2, wherein, if said destination node is reachable from said given node through a path of the fourth set, comprising:
searching for a path having the lowest run-through cost from said given node to said destination node in said fourth set of paths.

4. The method of claim 2, wherein, if said destination node is reachable from said given node through a path of the fourth set, comprising:
searching for a path having the lowest run-through cost from said given node to said destination node in both said fourth set of paths and said enhanced network topology.

5. The method of claim 4, wherein searching for a path having a lowest run-through cost from said given node to said destination node in both said fourth set of paths and said enhanced network topology, comprises:
selecting the path in said fourth set of paths having the lowest run-through cost from said given node to said destination node;
selecting the path in the enhanced network topology having the lowest run-through cost from said given node to said destination node; and
comparing the path in said fourth set of paths having the lowest run-through cost with the path in the enhanced network topology having the lowest run-through cost.

6. The method of claim 2, further comprising, after receiving at said given node a routing request specifying a destination node, checking if said destination node is reachable from said given node through a path of the fourth set.

7. The method of claim 2, further comprising:
updating a routing database with the paths of said first, second, third and fourth set of paths.

8. The method of claim 2, wherein each path comprises at least a network transmission resource and the method further comprises:
monitoring said network to determine variations in the resource availability that may affect the availability of at least one path in said fourth set of paths.

9. The method of claim 1, further comprising:
analyzing said network to discriminate said first nodes from said second nodes.

10. The method of claim 1, further comprising:
analyzing said network to determine network properties comprising said topology and said run-through costs associated with the paths.

11. The method of claim 1, wherein said first set of paths, said second set of paths and said third set of paths are searched by said given node.

12. The method of claim 1, wherein said fourth set of paths are searched by said given node.

13. The method of claim 1, wherein said network is a telecommunication network.

14. The method of claim 13, wherein said telecommunication network is an optical telecommunication network.

15. The method of claim 14, wherein said optical telecommunication network is a wavelength-switched optical telecommunication network and all said first and second nodes are configured to convert signal wavelengths.

16. The method of claim 14, wherein said first nodes are configured to transmit signals without regeneration and said second nodes are configured to transmit signals with regeneration.

17. The method of claim 13, wherein said first and second nodes comprise border nodes directly connected to client equipment, and wherein the step of constructing a simplified network topology is performed for each of said border nodes.

18. The method of claim 13, wherein said first and second nodes comprise border nodes directly connected to client equipment, and wherein the step of constructing an enhanced network topology is performed for each of said border nodes.

19. The method of claim 13, wherein said run-through cost is signal impairment and said predetermined cost is a maximum admissible signal impairment.

20. The method of claim 1, wherein each path comprises at least a network transmission resource and the method further comprises excluding from said enhanced network topology a path if it comprises at least an unavailable network transmission resource.

21. The method of any claim 1, further comprising:
monitoring said network to determine variations in said topology that may affect the availability of at least one path in said simplified network topology; and
re-constructing a simplified network topology for said given node if said variations are determined.

22. The method of claim 1, further comprising:
monitoring said network to determine variations in said topology that may affect the availability of at least one path in said enhanced network topology; and
re-constructing an enhanced network topology for said given node if said variations are determined.

23. A non-transitory, computer-readable medium encoded with a computer program configured to carry out the steps of the method according to claim 1.

* * * * *